Figure 1:
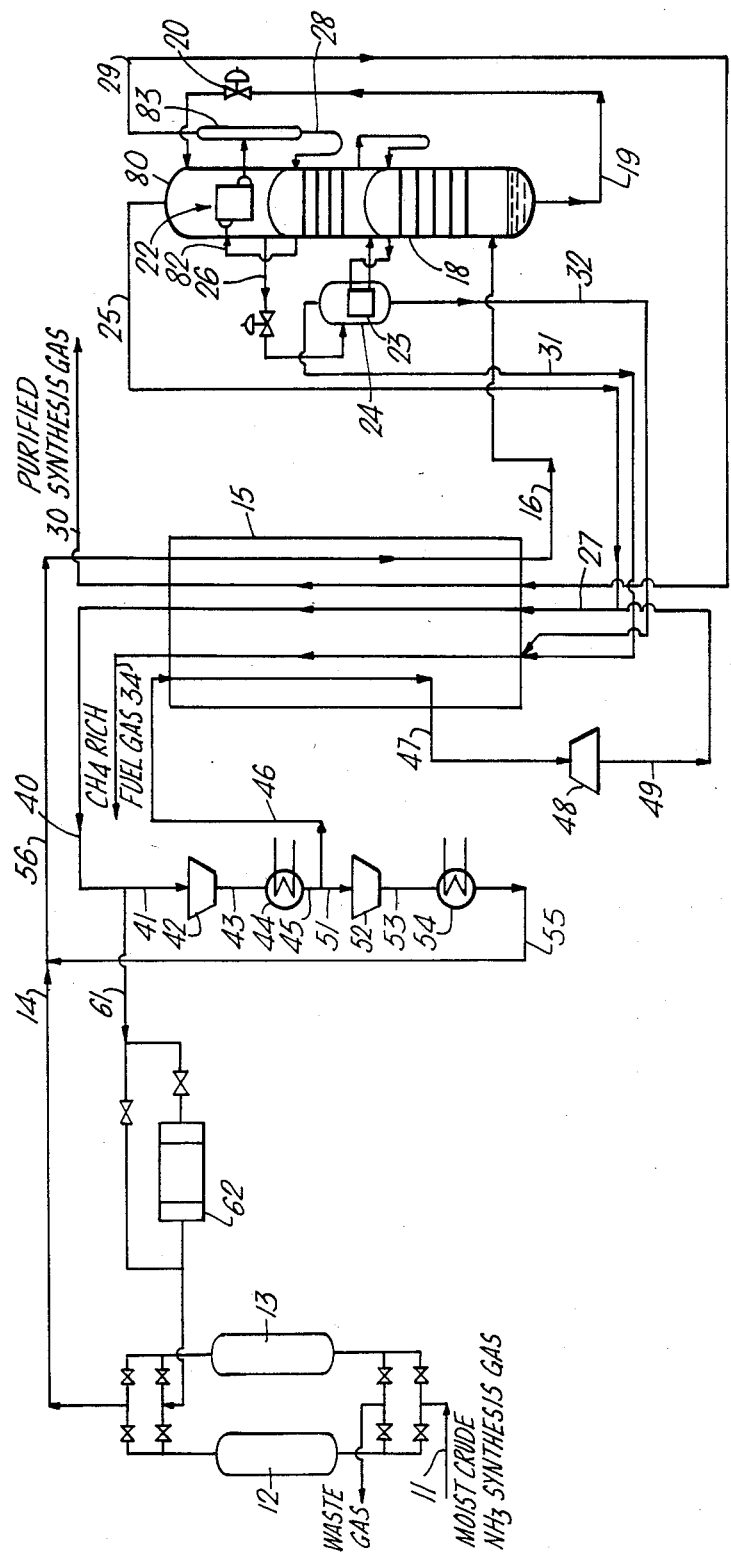

United States Patent [19]

Bligh

[11] Patent Number: 4,549,890
[45] Date of Patent: Oct. 29, 1985

[54] PROCESS AND PLANT FOR REMOVING METHANE AND ARGON FROM CRUDE AMMONIA SYNTHESIS GAS

[75] Inventor: Bernard R. Bligh, Hampton Hill, England

[73] Assignee: Air Products and Chemicals, Inc., Allentown, Pa.

[21] Appl. No.: 557,083

[22] Filed: Dec. 1, 1983

[30] Foreign Application Priority Data

Dec. 23, 1982 [GB] United Kingdom ................. 8236616
Apr. 28, 1983 [GB] United Kingdom ................. 8311579

[51] Int. Cl.$^4$ .............................................. F25J 3/02
[52] U.S. Cl. .......................................... 62/18; 62/22; 62/28; 62/30; 62/31; 62/34; 62/43
[58] Field of Search .................... 62/9, 11, 18, 22, 24, 62/27, 28, 29, 30, 31, 32, 33, 34, 38, 39, 42–44

[56] References Cited

U.S. PATENT DOCUMENTS 4,270,939 6/1981 Rowles et al. ........................ 62/22

Primary Examiner—Frank Sever
Attorney, Agent, or Firm—Carol A. Nemetz; James C. Simmons; E. Eugene Innis

[57] ABSTRACT

A process for removing methane and argon from crude ammonia synthesis gas, which method comprises the steps of:

(a) cooling said crude ammonia synthesis gas in a heat exchanger;
(b) distilling the cooled crude ammonia synthesis gas to provide purified ammonia synthesis gas and a liquid fraction containing methane, argon and nitrogen;
(c) expanding said liquid fraction containing methane, argon and nitrogen;
(d) introducing at least part of the liquid from step (c) into indirect heat exchange with vapor from the top of said distillation column to condense part of said vapor and provide reflux for said distillation column while simultaneously separating said liquid into a liquid stream rich in methane, and a gaseous stream rich in nitrogen;
(e) warming said gaseous stream from step (d);
(f) compressing at least part of the warmed gaseous stream from step (e);
(g) cooling at least part of the compressed gaseous stream from step (f);
(h) expanding at least part of the cooled gaseous stream from step (g); and
(i) passing the expanded gaseous stream from step (h) through said heat exchanger.

There is also provided a plant in which the said process can be carried out.

10 Claims, 2 Drawing Figures

PROCESS AND PLANT FOR REMOVING METHANE AND ARGON FROM CRUDE AMMONIA SYNTHESIS GAS

This invention relates to a process and a plant for removing methane and argon from crude ammonia synthesis gas.

Commercially, ammonia is synthesized by passing crude ammonia synthesis gas (a mixture containing essentially 3 moles of hydrogen to every mole of nitrogen) through a catalytic reactor. The gas leaving the catalytic reactor is cooled to condense product ammonia whilst the unreacted gas is recycled to the catalytic reactor. Unfortunately, the crude ammonia synthesis gas also contains small quantities of methane and argon which accumulate in the system. These impurities are generally kept at an acceptable level by continuously removing a portion of the unreacted gas as a purge. Apart from the loss of hydrogen and nitrogen in the purge the presence of argon and methane in the catalytic reactor tends to inhibit the desired production of ammonia.

In order to reduce these problems, it has been proposed in U.K. P - S Nos. 1,156,002 and 1,156,003 to remove part of the methane and argon from crude ammonia synthesis gas by subjecting the crude synthesis gas to a low temperature distillation.

Unfortunately, in both the proposed systems the methane and argon are removed together with a certain amount of nitrogen. In order to compensate for this loss of nitrogen the initial crude ammonia synthesis gas is enriched with nitrogen so that the gas passing through the catalytic reactor contains the requisite proportions of hydrogen to nitrogen. Typically, the volume of nitrogen will be such that the crude ammonia synthesis gas approaching the low temperature distillation units of U.K. P - S Nos. 1,156,002 and 1,156,003 will contain between 35% and 40% (by volume) nitrogen. In addition to the extra nitrogen required, extra compression costs are incurred in compressing the extra nitrogen. Furthermore, in the systems proposed, some of the refrigeration required is obtained by expanding the crude ammonia synthesis gas. This necessitates the subsequent recompression of the purified ammonia synthesis gas.

It is the object of at least preferred embodiments of the present invention to remove methane and argon from crude ammonia synthesis gas with lesser disadvantages than encountered in the prior art.

According to one aspect of the present invention there is provided a process for removing methane and argon from crude ammonia synthesis gas, which method comprises the steps of:

(a) cooling said crude ammonia synthesis gas in a heat exchanger;
(b) distilling the cooled crude ammonia synthesis gas to provide purified ammonia synthesis gas and a liquid fraction containing methane, argon and nitrogen;
(c) expanding said liquid fraction containing methane, argon and nitrogen;
(d) introducing at least part of the liquid from step (c) into indirect heat exchanger with vapour from the top of said distillation column to condense part of said vapour and provide reflux for said distillation column whilst simultaneously separating said liquid into a liquid stream rich in methane, and a gaseous stream rich in nitrogen;
(e) warming said gaseous stream from step (d);
(f) compressing at least part of the warmed gaseous stream from step (e);
(g) cooling at least part of the compressed gaseous stream from step (f);
(h) expanding at least part of the cooled gaseous stream from step (g); and
(i) passing the expanded gaseous stream from step (h) through said heat exchanger.

Typically, the crude ammonia synthesis gas will contain between 26% and 31% by volume nitrogen, and more usually between 26% and 30% nitrogen, with between 27% and 28% nitrogen being preferred. This should be contrasted against the prior art where 35% is usual.

Preferably, steps (e) and (g) are carried out in the same heat exchanger as steps (a) and (i) although they could be carried out in a separate and distinct heat exchanger.

Advantageously, part of the warmed gas from step (e) is compressed and introduced into said crude ammonia synthesis gas. Preferably, the cooled crude ammonia synthesis gas enters step (b) wholly in the gaseous phase, preferably at or not more than 10° C. above its dew point, and more preferably at or not more than 5° C. above its dew point.

If desired, part of the refrigeration required to achieve the distillating step (b) is provided by a condensed part of the cooled gaseous stream from step (g).

Typically, the crude ammonia synthesis gas will contain more than 2% (argon+methane) by volume and the purified ammonia synthesis gas will contain less than 0.5% by volume (argon+methane).

The present invention also provides a plant for removing methane and argon from crude ammonia synthesis gas, which plant comprises:

(a) a heat exchanger for cooling crude ammonia synthesis gas;
(b) a distillation column for distilling the cooled crude ammonia synthesis gas to provide, in use, purified ammonia synthesis gas and a liquid fraction containing methane, argon and nitrogen;
(c) means for expanding said liquid fraction containing methane, argon and nitrogen;
(d) means for, in use, conveying at least part of the liquid from step (c) into indirect heat exchange with vapour from the top of said distillation column to condense part of said vapour and provide reflux for said distillation column whilst simultaneously separating said liquid into a liquid stream rich in methane, and a gaseous stream rich in nitrogen;
(e) means to warm, in use, at least part of the gaseous stream from step (d);
(f) a compressor to compress, in use, the warmed gaseous stream from means (e);
(g) means to cool, in use, at least part of the compressed gaseous stream from said compressor;
(h) an expander for expanding, in use, at least part of the cooled compressed gaseous stream from means (g); and
(i) a pipe for carrying expanded gas from said expander to said heat exchanger.

Preferably, means (e) and (g) comprise said heat exchanger.

Figure 2:
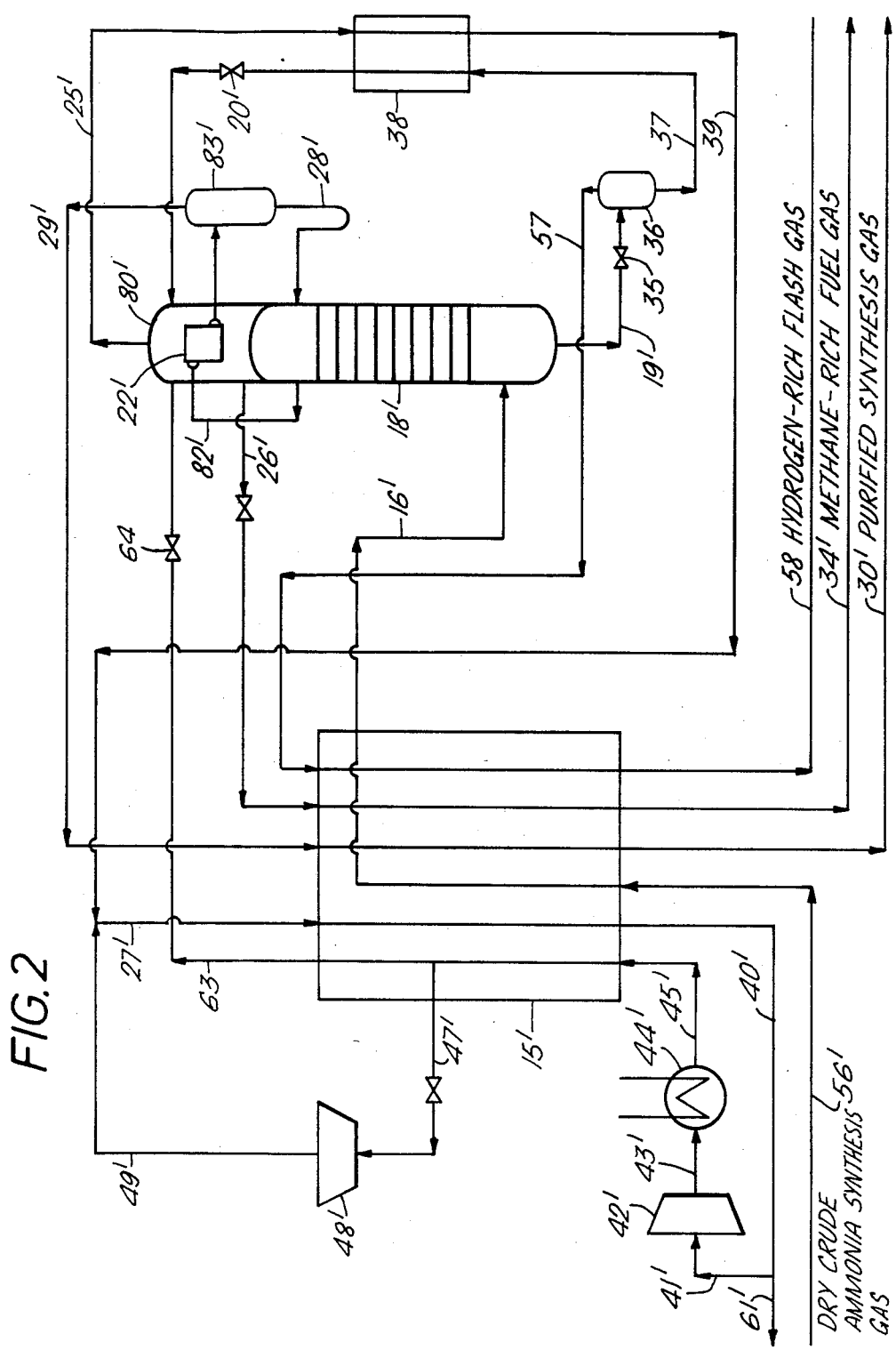

For a better understanding of the invention and to show how the same may be carried into effect, reference will now be made, by way of example, to the accompanying drawing in which:

FIG. 1 is a simplified flow sheet of one embodiment of a plant in accordance with the invention; and FIG. 2 is a simplified flow sheet of a second embodiment of a plant in accordance with the invention.

Referring to FIG. 1, moist crude ammonia synthesis gas at 29 bar absolute (bar A) passes through pipe 11 and one of driers 12 and 13 to pipe 14.

It is then combined with gas from pipe 55 and the combined stream is passed through pipe 56 to heat exchanger 15 wherein it is cooled to $-170°$ C. and partially condensed. The resulting liquid-vapour mixture passes through pipe 16 to distillation column 18 which has an intermediate reflux condenser 23 and a main reflux condenser 22.

A liquid containing the bulk of the methane present in the crude ammonia synthesis gas together with nitrogen and some of the argon present in the crude ammonia synthesis gas leaves the sump of the distillation column 18 through pipe 19. It is then let down in pressure at valve 20, and the mainly liquid flow resulting is passed into vessel 80 where it is partially vaporized to form a liquid stream rich in methane and a gaseous stream rich in nitrogen.

The liquid stream rich in methane leaves the vessel 80 through pipe 26 and is introduced into vessel 24 containing intermediate reflux condenser 23. Part of the liquid stream evaporates and the resulting vapour and liquid are passed through pipes 31 and 32 respectively to heat exchanger 15 wherein the liquid is vaporized. The vaporized liquid and vapour from pipe 31 are then warmed and leave the heat exchanger 15 through pipe 34 as methane rich fuel gas.

The gaseous stream rich in nitrogen leaves the vessel 80 through pipe 25. It is subsequently joined by cold gas from pipe 49 and the combined stream is passed through pipe 27 to heat exchanger 15 wherein it assists in cooling the incoming gas. After passing through heat exchanger 15, the warmed stream passes through pipe 40. A minor part of the warmed stream is passed through pipe 61 and heater 62 to the driers 12 and 13 wherein it is used to assist in regeneration. The major part of the warmed stream is passed through pipe 41 to compressor 42 wherein it is compressed to about 6 bar A. It is then passed through pipe 43 to water cooler 44 which it leaves through pipe 45. The compressed gaseous stream is then divided into a first sub-stream and a second sub-stream.

The first sub-stream passes through pipe 51 to compressor 52. After compression the gas passed through pipe 53 to water cooler 54, and then passed through pipe 55 to join the incoming crude ammonia synthesis gas.

The second sub-stream is passed through pipe 46 to heat exchanger 15 wherein it is cooled to about $-143°$ C. before being passed through pipe 47 to expander 48 wherein it is expanded to 1.5 bars A. The cold expanded gas is passed through pipe 49 to its junction with pipe 25.

Purified synthesis gas leaves the top of the distillation column 18 through pipe 82. Part is condensed in the main reflux condenser 22 and the resulting two phase mixture is separated in phase separator 83. Liquid is returned from the separator 83 through pipe 28 whilst the vapour is carried through pipe 29 to heat exchanger 15 where it is warmed and from which it leaves through pipe 30 as purified synthesis gas.

The compositions of various streams are given in Table 1.

TABLE 1

| | Flowrates in Kg-moles/100 kg-moles of feed | | | | | |
|---|---|---|---|---|---|---|
| Stream Number | 14 Dried Feed | 55 Recycle Stream | 56 Combined Stream | 30 Purified Ammonia Synthesis Gas | 40 | 34 CH$_4$ Rich Fuel Gas |
| H$_2$ | 69.06 | .85 | 69.91 | 68.46 | 1.45 | — |
| N$_2$ | 27.61 | 5.34 | 32.95 | 22.82 | 9.22 | .91 |
| Ar | .33 | .09 | .42 | .21 | .15 | .06 |
| CH$_4$ | 3.00 | .32 | 3.32 | .21 | .55 | 2.56 |
| | 100.00 | 6.60 | 1060.50 | 91.70 | 11.37 | 3.53 |

As can be seen from the description of FIG. 1, the crude ammonia synthesis gas passing through pipe 16 is partially condensed. In the embodiment shown this is essential.

We have now found that a better separation may occur if the crude ammonia synthesis gas enters the distillation column in the vapour phase at a temperature near its dew point. An embodiment disclosing this feature is shown in FIG. 2.

In particular, crude dry ammonia synthesis gas at 52.8 bar A in pipe 56' is cooled to $-160°$ C. in heat exchanger 15'. The gas leaves the heat exchange 2° C. above its dew point ($-162°$ C.) and passes through pipe 16' into the distillation column 18' which has a main reflux condenser 22'.

A liquid containing the bulk of the methane present in the crude ammonia synthesis gas together with some nitrogen and argon leaves the sump of the distillation column 18' through pipe 19'. It is then let down in pressure at valve 35 and is passed into separator 36 at a pressure of 20 bar A. A hydrogen-rich gas leaves separator 36 through pipe 57 and after being heated in heat exchanger 15' leaves the plant through line 58. The remaining liquid leaves separator 36 through line 37 and is sub-cooled to about $-174°$ C. in heat exchanger 38 before being let down in pressure at valve 20' and introduced into vessel 80' where it is partially vaporized to form a liquid stream rich in methane and a gaseous stream rich in nitrogen. Vessel 80' contains a reflux condenser 22'. Additional liquid nitrogen is introduced into vessel 80' as will be described later.

The liquid stream rich in methane leaves the vessel 80' through pipe 26' and passes into heat exchanger 15' where it is vaporized before leaving the plant through pipe 34' as methane rich fuel gas.

The gaseous stream rich in nitrogen leaves the vessel 80' through pipe 25'. It then passes through heat exchanger 38 and from there through pipe 39. It is subsequently joined by cold gas from pipe 49' and the combined stream is passed through pipe 27' to heat exchanger 15' where it assists in cooling the incoming gas. After passing through heat exchanger 15' the warmed stream passes through pipe 40'. Part of the warmed stream is passed through pipe 61' to feed driers (not shown) wilst the balance is passed through pipe 41' to compressor 42' wherein it is compressed to about 13 bar A. It is then passed through pipe 43' to water cooler 44' which it leaves through pipe 45'. It is then cooled to about $-119°$ C. in heat exchanger 15' wherein it is divided into a first sub-stream and a second sub-stream.

The first sub-stream is cooled and condensed in the heat exchanger 15'. The condensed liquid leaves the heat exchanger 15' through pipe 63 and is let down in pressure at valve 64 before entering the vessel 80'.

The second sub-stream passes through pipe 47' to expander 48' wherein it is expanded to about 2 bar A. The cold expanded gas is passed through pipe 49' to its junction with pipe 39.

Purified synthesis gas leaves the top of the distillation column 18' through pipe 82'. Part is condensed in the main reflux condenser 22' and the resulting two phase mixture is separated in phase separator 83'. Liquid is returned from the separator 83' through pipe 28' whilst the vapour is carried through pipe 29' to heat exchanger 15' where it is warmed and from which is leaves through pipe 30' as purified synthesis gas.

The composition of various streams are given in Table 2.

TABLE 2

| | Flowrates in Kg-moles/100 Kg-moles of feed | | | | |
|---|---|---|---|---|---|
| Stream Number | 56' Dried Feed | 30' Purified Ammonia Synthesis Gas | 61' Gas to Driers | 34' Methane-rich fuel | 58 Hydrogen rich Flash Gas |
| $H_2$ | 67.14 | 66.00 | .26 | 0.0 | 0.88 |
| $N_2$ | 28.77 | 22.08 | 4.49 | 1.45 | 0.75 |
| Ar | .55 | .24 | .14 | 0.15 | 0.02 |
| $CH_4$ | 3.54 | .01 | .30 | 3.18 | 0.05 |
| | 100.00 | 88.33 | 5.19 | 4.78 | 1.70 |

The embodiment shown in FIG. 2 has significant advantages over the embodiment shown in FIG. 1. Firstly the compressor 52 is redundant. Secondly, the purified synthesis gas contains only 0.01 mole % methane impurity compared with about 0.23% methane impurity in the first embodiment.

Whilst the crude ammonia synthesis gas in FIG. 2 is cooled to 2° C. above its dew point before being introduced into the distillation column 18' it is anticipated that the favourable effects described will apply over a fairly wide range of temperatures, typically from the dew point to about 10° C. thereabove. However, we would expect to cool the crude ammonia synthesis gas to between its dew point and 5° C. thereabove and normally between 1° C. and 3° C. above its dew point.

It should be appreciated that the intermediate reflux condenser 23 shown in FIG. 1 is an optional feature. A similar reflux condenser 23 could be used in the embodiment of FIG. 2 if desired. Similarly, the separator 36 and the heat exchanger 38 shown in FIG. 2 are optional. Such features could also be applied to the embodiment shown in FIG. 1.

Whilst the preferred embodiments described refer to moist ammonia synthesis gas at 29 bar A and 53 bar A, the process is readily operable with moist crude ammonia synthesis gas at between 24 bar A and 70 bar A.

Depending upon precise process conditions, the crude ammonia synthesis gas for use in the present invention typically requires 26% to 31%, (preferably 26% to 30% and more preferably 27% to 28%) by volume nitrogen to produce a purified ammonia synthesis gas having the required 3:1 proportions of hydrogen to nitrogen. In contrast, the prior art processes described in U.K. P - S Nos. 1,156,002 and 1,156,003 would require crude ammonia synthesis gas having at least 30% (by volume) nitrogen and typically around 35% nitrogen. The compression of this additional nitrogen in the prior art is a considerable cost penalty.

I claim:
1. A process for removing methane and argon from crude ammonia synthesis gas, which method comprises the steps of:
   (a) providing a crude ammonia synthesis gas having 26–31 volume percent nitrogen;
   (b) cooling said crude ammonia synthesis gas in a heat exchanger;
   (c) distilling the cooled crude ammonia synthesis gas to provide purified ammonia synthesis gas and a liquid fraction containing methane, argon and nitrogen;
   (d) expanding said liquid fraction containing methane, argon and nitrogen;
   (e) introducing at least part of the liquid from step (d) into indirect heat exchange with vapor from the top of said distillation column to condense part of said vapor and provide reflux for said distillation column whilst simultaneously separating said liquid into a liquid stream rich in methane, and a gaseous stream rich in nitrogen;
   (f) warming said gaseous stream from step (e);
   (g) compressing at least part of the warmed gaseous stream from step (f);
   (h) cooling at least part of the compressed gaseous stream from step (g);
   (i) expanding at least part of the cooled gaseous stream from step (h); and
   (j) passing the expanded gaseous stream from step (i) through said heat exchanger.
2. A process according to claim 1 wherein steps (f) and (h) are carried out in the same heat exchanger as steps (b) and (j).
3. A process according to claim 2, wherein part of the warmed gas from step (f) is compressed and introduced into said crude ammonia synthesis gas.
4. A process according to claim 1, wherein part of the warmed gas from step (f) is compressed and introduced into said crude ammonia synthesis gas.
5. A process according to claim 1, wherein the cooled crude ammonia synthesis gas enters step (c) wholly in the gaseous phase.
6. A process according to claim 5, wherein said cooled crude ammonia synthesis gas enters step (c) at or not more than 10° C. above its dew point.
7. A process according to claim 5, wherein said cooled crude ammonia synthesis gas enters step (c) at or not more than 5° C. above its dew point.
8. A process according to claim 5 wherein part of the refrigeration required to achieve the distilling step (c) is provided by a condensed part of the cooled gaseous stream from step (h).
9. A plant comprising means designed for removing methane and argon from crude ammonia synthesis gas having 26–31 volume percent nitrogen, which plant including:
   (a) a heat exchanger for cooling crude ammonia synthesis gas;
   (b) a distillation column for distilling the cooled crude ammonia synthesis gas to provide, in use, purified ammonia synthesis gas and a liquid fraction containing methane, argon and nitrogen;
   (c) means for expanding said liquid fraction containing methane, argon and nitrogen;
   (d) means for, in use, conveying at least part of the liquid from step (c) into indirect heat exchange with vapour from the top of said distillation column to condense part of said vapour and provide reflux for said distillation column whilst simultaneously separating said liquid into a liquid stream rich in methane, and a gaseous stream rich in nitrogen;

(e) means to warm, in use, at least part of the gaseous stream from step (d);

(f) a compressor to compress, in use, the warmed gaseous stream from means (e);

(g) means to cool, in use, at least part of the compressed gaseous stream from said compressor;

(h) an expander for expanding, in use, at least part of the cooled compressed gaseous stream from means (g); and (i) a pipe for carrying expanded gas from said expander to said heat exchanger.

10. A plant as claimed in claim 9 wherein means (e) and (g) comprise said heat exchanger.

* * * * *